(12) United States Patent
Neils et al.

(10) Patent No.: US 7,167,955 B1
(45) Date of Patent: Jan. 23, 2007

(54) SYSTEM AND METHOD FOR TESTING AND INITIALIZING DIRECTORY STORE MEMORY

(75) Inventors: Justin S. Neils, Hudson, WI (US); John S. Jensen, Minneapolis, MN (US); Mitchell A. Bauman, Circle Pines, MN (US); Eugene A. Rodi, Minneapolis, MN (US); Bart E. Reigstad, Shoreview, MN (US)

(73) Assignee: Unisys Corporation, Blue Bell, PA (US)

( * ) Notice: Subject to any disclaimer, the term of this patent is extended or adjusted under 35 U.S.C. 154(b) by 478 days.

(21) Appl. No.: 10/745,372

(22) Filed: Dec. 23, 2003

(51) Int. Cl.
*G06F 12/00* (2006.01)

(52) U.S. Cl. ...................... 711/141; 711/155
(58) Field of Classification Search ................ 711/141, 711/155
See application file for complete search history.

(56) References Cited

U.S. PATENT DOCUMENTS

| | | |
|---|---|---|
| 4,562,536 A | 12/1985 | Keeley et al. |
| 4,667,288 A | 5/1987 | Keeley et al. |
| 4,686,621 A | 8/1987 | Keeley et al. |
| 6,073,249 A * | 6/2000 | Watabe et al. ................ 714/4 |
| 6,212,616 B1 | 4/2001 | Arimilli et al. |

OTHER PUBLICATIONS

U.S. Appl. No. 10/318,678, entitled, "System and Method for Accelerating Read Requests Within a Multiprocessor System," filed Dec. 13, 2002.
U.S. Appl. No. 10/330,991, entitled, "Memory Controller Having Programmable Initialization Sequence," filed Dec. 27, 2002.

* cited by examiner

*Primary Examiner*—Hiep T. Nguyen
(74) *Attorney, Agent, or Firm*—Charles A. Johnson; Mark T. Starr; Crompton, Seager & Tufte, LLC

(57) ABSTRACT

A system and method for testing and/or initializing a Directory Store in a directory-based coherent memory. In one illustrative embodiment, the directory-based coherent memory includes a Main Store for storing a number of data entries, a Directory Store for storing the directory state for at least some of the data entries in the Main Store, and a next state block for determining a next directory state for a requested data entry in response to a memory request. To provide access to the Directory Store, and in one illustrative embodiment, a selector is provided for selecting either the next directory state value provided by the next state block or another predetermined value. The other predetermined value may be, for example, a fixed data pattern, a variable data pattern, a specified value, or any other value suitable for initializing and/or testing the Directory Store. The output of the selector may be written to the Directory Store.

55 Claims, 6 Drawing Sheets

SYSTEM AND METHOD FOR TESTING AND INITIALIZING DIRECTORY STORE MEMORY

TECHNICAL FIELD

This invention relates generally to directory-based coherent memories for computer systems and more particularly to systems and methods for testing and initializing directory store memory.

BACKGROUND

In many computer systems, one or more processors access a main memory for instructions and data. Typically, the main memory is not capable of supplying data and instructions to the processors at adequate speeds. To compensate for the speed deficiencies of main memory, caches are usually incorporated. Caches are small high-speed memories located between main memory and a processor, and that are updated to contain memory data that was recently requested by the processor. The processor can generally obtain a copy of memory data much more quickly from its cache than from the main memory.

In multiprocessor systems, multiple copies of a particular data item may reside within multiple caches at any given time. Because of this, a memory coherency protocol must be used to ensure that all processors within the system operate from the same, most recent, copy of the memory data. This type of protocol allows data to be shared among many devices for read-only purposes. Before a device can modify the data, it must gain exclusive access to the data. In this case, all other cached copies of the data are marked as unusable, or "invalidated". After a device gains exclusive access to data, the device may, but is not required to, modify the data. When a device relinquishes exclusive access rights, any updated copy of the data must be stored back to the main memory, or provided to another cache within the system.

Directory-based coherent memories use a memory coherency protocol that has both a Directory Store and a Main Store. The Main Store stores the data, often including both instructions and operands, which may be referenced by any of the processors within the system. The Directory Store stores information that indicates where the latest copy of the data resides within the system to ensure that every processor is operating from the most recent copy.

A difficulty in many directory-based coherent memories is that it is often difficult to initialize and/or test and diagnose the Directory Store within the directory-based coherent memory because, in many cases, there is no direct and/or efficient way to access the Directory Store. Therefore, what would be desirable is a system and method for efficiently testing and/or initializing a Directory Store in a directory-based coherent memory.

SUMMARY

The present invention provides systems and methods for testing and/or initializing a Directory Store in a directory-based coherent memory. In one illustrative embodiment of the present invention, the directory-based coherent memory includes a Main Store for storing a number of data entries, a Directory Store for storing the directory state for at least some of the data entries in the Main Store, and a next state block for determining a next directory state for a requested data entry in response to a memory request. To provide access to the Directory Store, and in the illustrative embodiment, a selector is provided for selecting either the next directory state value provided by the next state block or another predetermined value. The other predetermined value may be, for example, a fixed data pattern, a variable data pattern, a specified value, or any other value suitable for initializing and/or testing the Directory Store. The output of the selector may then be written to the Directory Store.

In some embodiments, one or more port exercisers may be provided in the directory-based coherent memory. The port exercisers may be used to, for example, initiate reads and writes to the directory-based coherent memory for initialization and/or testing purposes. The selector mentioned above may be used to substitute one or more predetermined value(s) for the next directory state value during at least some of the reads and/or writes initiated by the port exercisers. The selector may work independently of, but in cooperation with, the one or more port exercisers.

In some cases, the Directory Store is accessed using a Read/Modify/Write operation. During the read cycle of a Read/Modify/Write operation, the current directory state of the requested data entry may be read from the Directory Store and, in some cases, compared to an expected value. During the write cycle of the same Read/Modify/Write operation, the selector may substitute a predetermined value such as a test pattern for the next directory state value. This may provide an efficient way to read, compare and write a wide variety data patterns to the Directory Store for initialization and/or testing purposes.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION

Figure 1:
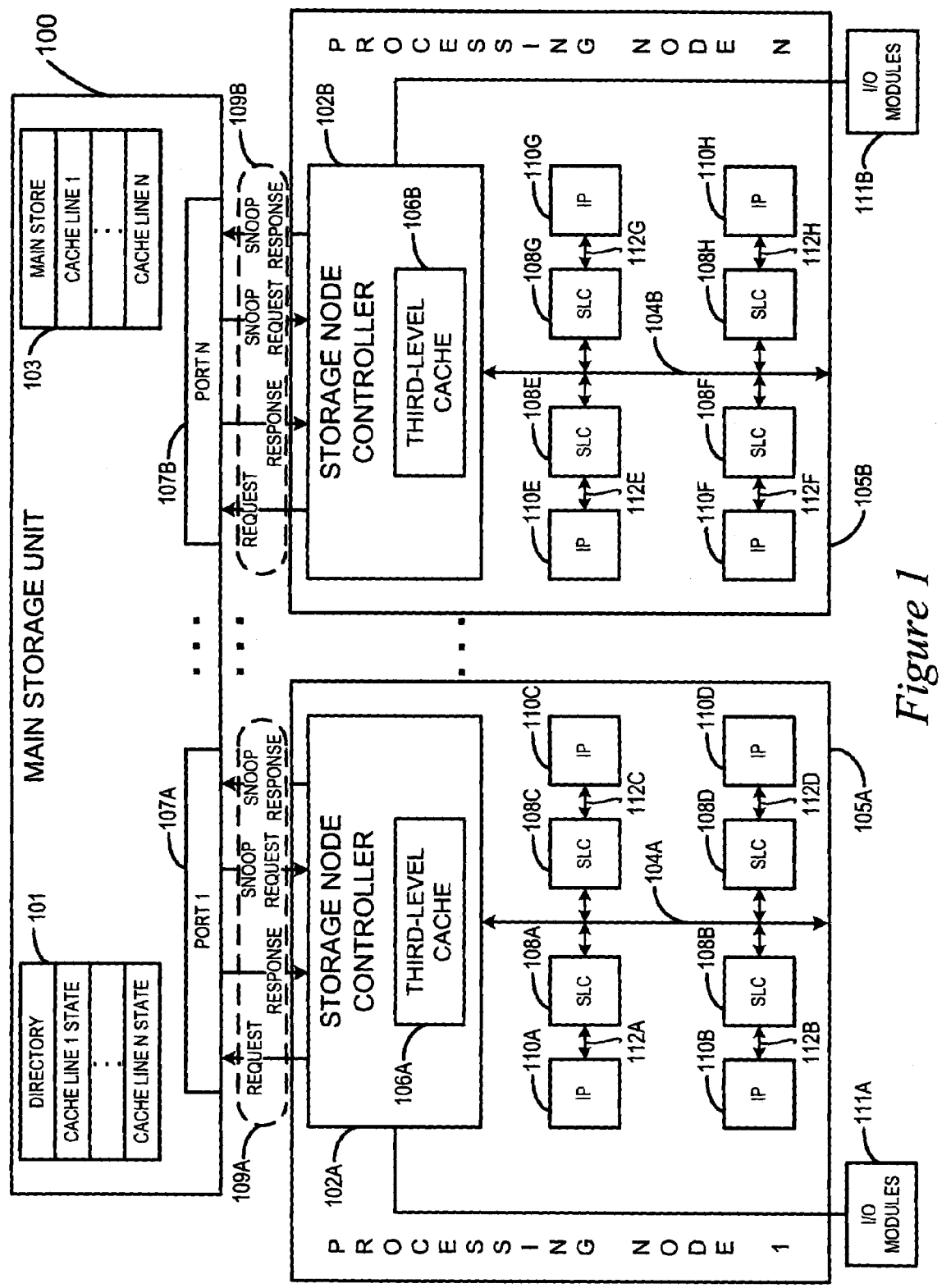
FIG. 1 is a block diagram of an illustrative data processing system that may employ the present invention.

FIG. 1 is a block diagram of an illustrative data processing system that may employ the present invention. The system includes a Main Storage Unit (MSU) 100 that provides the main memory for the system. Although the system of FIG. 1 includes only a single MSU 100, multiple MSUs may be provided, each being mapped to a portion of the system address space in a manner largely beyond the scope of the current application. MSU 100 may include Random Access Memory (RAM), Read-Only Memory (ROM), and/or any other type of memory known in the art.

In the illustrative embodiment, MSU 100 is a directory-based coherent memory that may be similar to the system described in U.S. Pat. No. 6,587,931, entitled "Directory based Cache Coherency System Supporting Multiple Instruction Processor and Input/Output Caches", assigned to the assignee of the present invention and, which is incorporated herein by reference. In this embodiment, MSU 100 includes both a Directory Store 101 and a Main Store 103. Main Store 103 stores the data, including the instructions and operands, which may be referenced by any of the processors within the system. Directory Store 101 stores information that indicates where the latest copy of the data resides within the system to ensure that every processor is operating from the most recent copy. As discussed above, this may be desirable since data from Main Store 103 may be copied into any of the various cache memories within the system.

The Directory Store 101 may include a directory entry for each 128-byte is cache line. Other embodiments may utilize cache lines of different sizes. The cache lines are shown within Main Store 103 as "cache line 1" through "cache line N". The respectively associated entries within Directory Store 101 are shown as "cache line 1 state" through "cache line N state".

MSU 100 is coupled to one or more processing nodes shown as processing node 1 105A through processing node N 105B. More or fewer processing nodes and memory ports may be included within the system. Each processing node is connected to a different memory port shown as port 1 107A through port N 107B, respectively, via dedicated high-speed interfaces 109A through 109B (shown dashed), sometimes referred to as the Scalability Port MegaCell (SPMC). Each of these interfaces has four sets of signals, including request, response, snoop request, and snoop response signals.

Each processing node may also be coupled to an I/O complex, shown as I/O modules 111A and 111B. Each of these I/O modules contains one or more industry-standard or proprietary I/O modules that communicate with storage medium such as disk tape subsystems and communication equipment.

Each processing node includes a Scalable Node Controller (SNC) shown as SNCs 102A and 102B for processing nodes 1 and N, respectively. Each SNC includes logic that interfaces with a respective high-speed MSU interface 109A or 109B, and further includes logic to interface to a respective one of processor buses 104A and 104B. Each SNC includes a respective ownership cache and all supporting logic. This cache may be a Third-Level Cache (TLC), a Fourth-Level Cache (4LC), or some other type of cache memory. In the embodiment shown, these caches are TLCs 106A and 106B. The ownership caches are discussed further below.

As noted above, each of the SNCs 102A and 102B is coupled to a respective processor bus 104A and 104B. These processor buses can utilize any type of bus protocol. Each processor bus interfaces to multiple local cache memories. In the illustrative embodiment shown, the local cache memories are shown as Second-Level Caches (SLCs) 108A–108H. In another embodiment, these local caches may be Third-Level Caches.

Each SLC is coupled to a respective one of the Instruction Processors (IPs) 110A–110H over a respective interface 112A–112H. For example, SLC 108A is coupled to IP 110A via interface 112A, SLC 108B is coupled to IP 110B via interface 112B, and so on. Each of the IPs may be any type of processor such as a 2200™ processor commercially available from Unisys Corporation, a processor commercially available from Intel® Corporation, or any other processor known in the art. Each IP may include one or more on-board caches. In the illustrative embodiment, each IP may include a First-Level Cache (FLC) (not shown). Preferably, each IP resides on a single Application Specific Integrated Circuit (ASIC) device with a respective SLC 108. Alternatively, an IP may be coupled to a respective SLC over an external interface.

In general, the caches within the processing nodes are ownership caches. As such, each cache maintains information that describes the state of each of the cache lines resident within the cache. A cache line may be in at least one of four mutually exclusive states, including a modified, exclusive, shared, or invalid state. These states are sometimes said to implement a "MESI" protocol. These states indicate the types of access rights that are associated with the cache line data.

When a cache line is stored in the modified state, the cache line copy has been modified, and is therefore the most up-to-date copy of the cache line that resides within the system. All other copies of this cache line are said to be "stale" or outdated, and cannot be used, either for read-only or read/write purposes. At any given time, only one cache may store a copy of a particular cache line in the modified state. The cache that stores such a copy is said to "own" the cache line. If another processor requires use of the cache line, it must obtain the updated copy. Until another cache obtains the updated copy, the modified cache line copy may be used for read and/or write purposes by one or more processor associated with the cache that stores the cache line.

When a cache line is retained in the exclusive state, the cache stores the latest cache line copy. Until this cache line is modified, the MSU also stores the latest copy of this data. At any given time, only one cache may store a valid copy of the cache line in the exclusive state. This cache line may be used for read and/or write purposes, and is said to be owned by the cache.

A cache line may further be stored within a cache in a shared state. In this case, the cache line is used for read-only purposes. The cache line may be stored in multiple caches within the system in the shared state. If another cache requests exclusive access to the cache line, all copies of that cache line that exist in the shared state must be "invalidated", or marked as unusable.

Finally, a cache line may reside within a cache in an invalid state. In this case, the cache line has been marked as unusable, and can not be used for read or write purposes. If a cache requires the use of an invalid cache line, it must obtain a valid copy from another memory within the system.

The manner in which memory requests are processed within the system can best be understood by example. Assume IP 110A requires read/write access to a cache line. If IP 110A first attempts to retrieve the cache line from its internal cache(s) such as its FLC. If the cache line is not resident within the FLC, a request is sent to the respective SLC 108A. If the requested cache line is likewise not resident within the SLC, the SLC issues a request on the processor bus 104A. In one embodiment of the invention, each SLC implements a bus snoop protocol to monitor the processor bus for such requests. When the request is "snooped" by the SLCs 108B–108D, and SLC that retains the data in the requested state will return the data on processor bus 104A. Similarly, SNC 102A is snooping the bus for such requests. If TLC 106A stores the most recent copy of the cache line in the desired state, the cache line will be returned to the SLC 108A and forwarded to IP 110A.

In some instances, data requested by IP 110A is not resident in the requested state within any of the cache memories associated with its processor bus 104A. In that case, SNC 102A uses the request signals of interface 109A to forward the request to MSU 100. The request signals include a cache line address, a requester identifier to indicate which processing node or I/O module provided the request, and a transaction identifier for tracking multiple requests from a single node. If the request is of a type that includes data, the write data will also be provided by the request signals. The request signals further include a request type to indicate whether the processing node is requesting the cache line in the exclusive state so that read and write operations may be performed, or whether the cache line is requested in the shared state for read-only purposes. The various request types are discussed below. Finally, the request signal provides a unique identifier for the destination called the DestNodeId and a unique identifier for the source called the SrcNodeID. The DestNodeID and SrcNodeID are used to route the request to its destination and the response back to the requester that originated the request. In an embodiment such as that mentioned above wherein MSU 100 includes multiple memory units, these identifiers indicate which of these units are to receive the request and the response After receiving the request, MSU 100 determines the location and state of the most recent copy of the cache line using the cache line state information stored within its Directory Store 101. In the illustrative embodiment, Directory Store 101 indicates that a cache line is in one of a number of predetermined states that include, but are not limited to, the following:

MSU Own;

Exclusive; and

Shared.

MSU Own State

All cache lines in the MSU are placed in the MSU own state after system initialization and before any cache lines have been copied into one of the system caches. This state indicates that the MSU has the most recent copy of the cache line. Since only the MSU 100 is considered to have a valid copy of any cache line that is in the MSU own state, an error occurs if any SNC 102A issues a request to write to a cache line that is in this state.

Exclusive State

This state is described above in regards to the MESI protocol. When MSU 100 grants a copy of a cache line to a processing node for read and/or write purposes, Directory Store 101 records the processing node's identity, and indicates that cache line is held in the exclusive state. Once a cache line is granted in an exclusive state, the copy retained by the MSU 100 may not be provided to another processing node. If the MSU 100 receives another request for the cache line while it is in this state, the MSU 100 must retrieve the cache line copy from the owner by issuing a snoop request, as will be discussed below.

Shared State

This state is described above in regards to the MESI protocol. In this state, the cache line may reside within one, several, or all of the caches in the system at once for read-only purposes. The MSU is still considered to have a valid copy of the cache line, which may be provided to another cache for read-only purposes. Directory Store 101 records which one or more of the processing nodes have a valid copy of the cache line.

Returning to the current example, if the cache line is resident within MSU 100 in the MSU own state, MSU provides this data directly to processing node 1 105A over the response lines of interface 109A. These lines include data signals, source and destination identifiers referred to as the SrcNodeID and the DestNodeID, the transaction ID, and a response type. The transaction ID is the same as that included with the original request, and is used by the SNC 102A to match the request to the response. The SourceNodeID and DestinationNodeID are used to Route the request thru the system and to insure that the response gets sent back to the unit that originated the request. The response type indicates if the request was completed and indicates the status of the cache line in the requester. One possible response type is Retry, which results in a request retry. The MSU 100 delivers the cache line of data to processing node 1 105A with a state of exclusive. MSU 100 further updates Directory Store 101 to record that processing node 1 105A retains the cache line copy in the exclusive state.

The foregoing discussion assumes the cache line is available within MSU 100 in a state that allows its immediate return to the requester. Assume, instead, that the cache line state information stored within Directory Store 101 indicates that the cache line is retained in the exclusive state by processing node N 105B. The MSU 100 is therefore not able to provide the cache line directly to processing node 1 105A, but instead must issue a snoop request to processing node N 105B to prompt the return of any updated cache line data to MSU 100.

A snoop request is issued to processing node 105B from port N 107B across the snoop request lines of interface 109B. These signals include a cache line address, a snoop type, a source and destination identifier, and a transaction tracking identifier. The snoop type indicates the type of snoop request being issued. The destination identifier indicates the processing node that is to receive the request, and the transaction tracking identifier is an identifier generated within MSU 100 that is used to later match a snoop response to the snoop request.

Upon receiving the snoop request, directory state information stored within TLC 106B is used to determine whether any of the SLCs 108E–108H has a copy of the data. If not, SNC 102B may return the cache line directly to MSU 100. This return of ownership and data is issued across the snoop response lines of interface 109B. The snoop response lines include cache data signals, response type signals, and the transaction-tracking id that was provided with the snoop request. If, however, any of the SLCs 108E–108H retains a copy of the cache line, SNC 102B issues a request to each of the SLCs 108B–108H via bus 104B requesting return of ownership and any modified data. This request is snooped by SLCs 108B–108H such that any of these SLCs having a valid data copy will invalidate that copy, and will further invalidate any copy stored by the associated FLC. If any one of these SLCs had acquired exclusive ownership of, and subsequently modified the data, that modified copy is returned to SNC 102B during a "write back" operation. If the data is not modified, only ownership is returned. SNC 102B then returns ownership and, if necessary, modified data to MSU 100 using a snoop response, as discussed above.

After the snoop response is forwarded to MSU 100, MSU 100 routes any returned data from port N 107B to port 1 107A via a port-to-port interface (not shown in FIG. 1). The data, which is modified, and is therefore the most up-to-date copy of the cache line, is provided to processing node 1 via interface 109A. If data is not returned with the snoop response, the data is obtained from Main Store 103 and provided to processing node 1 105A.

When SNC 102A receives the cache line data, it provides this data in the exclusive state to requesting IP 110A via SLC 108A so that execution may continue. IP 110A and SLC 108A now own this cache line. State information within TLC 106A records that processing node 1 105A retains a copy of this cache line in the exclusive state.

Figure 2:
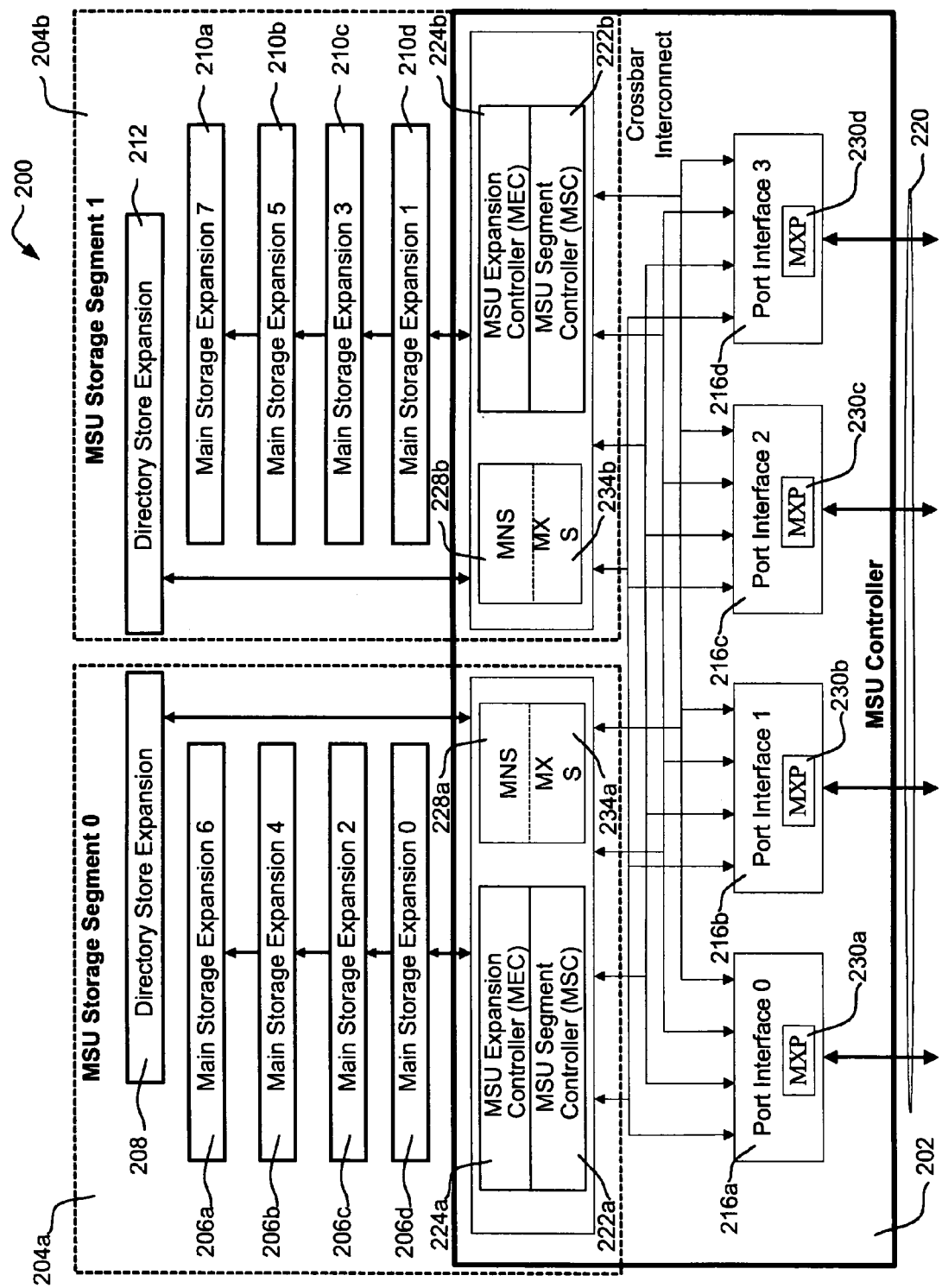
FIG. 2 is a block diagram of an illustrative Main Storage Unit (MSU) in accordance with the present invention.

FIG. 2 is a block diagram of another illustrative Main Storage Unit (MSU) 200 in accordance with the present invention. MSU 200 may be the same or similar to MSU 100 discussed above. The primary functionality of the MSU 200 is to provide a directory-based coherent memory system for system/user software instructions and data. The MSU 200 reads and writes to a Main Store (MS) on a Cache Line basis, and thus reads and/or writes an entire Cache Line during each memory access. Like above, a Directory based coherency scheme is used to maintain memory coherency in the system.

In the illustrative embodiment, there is one unique directory entry in the Directory Store (DS) for each addressable Cache Line in the MSU 200. The Directory Store (DS) contains the state information for all the Cache Lines in the MSU. A Cache Line is resident in the entity that owns it. The Directory Store (DS) information is used by the MSC section and MSOH section to track ownership of the Cache Lines held within the MSU, initiate special transactions to retrieve, and/or invalidate them if they reside in an external cache.

Referring specifically to FIG. 2, the MSU 200 includes an MSU Controller 202, which is in communication with two independent MSU Storage Segments and that can be accessed in parallel, namely MSU Storage Segment-0 204a and MSU Storage Segment-1 204b. The available address range of the MSU 200 is divided among the two MSU Storage Segments 204a and 204b, where any particular address will only be associated with one of the MSU Storage Segments 204a and 204b. As such, and based on the transaction address, a memory request transaction will be routed to the appropriate one of the MSU Storage Segments 204a and 204b by the MSU Controller 202.

In the illustrative embodiment, each MSU Storage Segment 204a and 204b includes four Main Storage Expansions and one Directory Store Expansion. For example, MSU Storage Segment 204a includes four Main Storage Expansions 206a–206d, and one Directory Store Expansion 208. Likewise, MSU Storage Segment 204b includes four Main Storage Expansions 210a–210d, and one Directory Store Expansion 212. Each of the MSU Storage Expansions and Directory Store Expansions may include, for example, one or more Dual Inline Memory Modules (DIMMs) (not shown). In one illustrative embodiment, the DIMMs may be commercial off the shelf DIMM memories that provide the desired system storage capacity. In many cases, each DIMM may be populated with a number of Double Data Rate Synchronous Dynamic Random Access Memory (DDR SDRAM) devices. The DDR SDRAM devices that populate the Directory Store Expansion's 212 DIMMs (not shown) may be the same type as used in DIMMS of the Main Storage Expansions 210a–210d. In some embodiments, the Directory Store Expansion DIMM has the same or larger capacity as the largest Main Storage Expansion DIMM in the corresponding MSU Storage Segment 204a and 204b.

There is one unique Directory Store entry for each addressable Cache Line in the MSU 200. Each Directory Store Expansion holds the ownership state for all of the cache lines stored in the corresponding MSU Storage Segment. For example, and in the illustrative embodiment, Directory Store Expansion 208 holds the ownership state for all of the cache lines stored in the MSU Storage Segment 204a, and Directory Store Expansion 212 holds the ownership state for all of the cache lines stored in the MSU Storage Segment 204b. The content of each Directory Storage Expansion entry corresponds to the Directory State of an associated Cache Line in the corresponding MSU Storage Segment.

The illustrative MSU Controller 202 includes four Port Interface Blocks 216a–216d, which independently communicate with four Scalable Node Controllers (SNC) (see FIG. 1) through a high speed bi-directional interface sometimes called a Scalability Port MegaCell (SPMC) 220. Requests received through the SPMC 220 are used to initiate MSU 200 reads and writes, MSU coherency actions, and in some cases, non-memory communications. Responses from the MSU 200 are sent out though the SPMC 220.

The MSU Controller 202 also includes a MSU Segment Controller (MSC) for each MSU Storage Segment 204a and 204b. For example, the MSU Controller 202 includes a MSC 222a for MSU Storage Segment 204a and a MSC 222b for MSU Storage Segment 204b. The MSC's process main storage requests received through the Port Interfaces 216a–216d by initiating a read or write data sequence to one of the four MSU Main Storage Expansions in the corresponding MSU Storage Segment 204a and 204b, based on address. Each MSC 222a and 222b determines if the requested address is located in the corresponding MSU Storage segment 204a and 204b, respectively, before processing the main storage request provided by the Port Interfaces 216a–216d.

In the illustrative embodiment, each MSC 222a and 222b can have up to four MSU Storage Expansion requests active simultaneously. This simultaneous processing can occur across the corresponding MSU Main Storage Expansions, or across multiple banks within a particular MSU Main Storage Expansion, again based on address. Each MSC 222a and 222b is also responsible for maintaining the directory subsystem, and can initiate coherency requests as required by the input request to retrieve updated data and ownership from other system caches or to invalidate copies of data held by other system caches. The coherency requests correspond to the snoops, as discussed above with respect to FIG. 1. The tracking of the activities relating to servicing the memory requests and corresponding updates of the directory subsystem is the responsibility of the MSCs 222a and 222b in the illustrative embodiment.

After the requested read data is delivered, or requester data is written to main storage, and all appropriate coherency operations relating to a request are complete, the corresponding MSC 222a or 222b may mark the transaction as complete and remove it from a Transaction Tracking Queue (TTQ), as further discussed below with request to FIG. 3. In the illustrative embodiment, each MSU Storage Segment 204a and 204b has its own MSC 222a and 222b, respectively, and each of MSCs 222a and 222b operates independently of the MSC for the other MSU Storage Segment.

The MSU Controller 202 may also include an MSU Expansion Controller (MEC) 224a and 224b for each MSU Storage Segment 204a and 204b, respectively. The MECs 224a and 224b may provide the access path to and from the corresponding Main Storage Expansions and the Directory Store Expansion. The MECs provides the control logic, address and timing protocols used to access the DIMM memories, including the Directory Store DIMM memory in the corresponding Main Storage Segment.

In the illustrative embodiment, the MECs 224a and 224b access their corresponding Directory Store Expansions 208 and 212, respectively, by using a Read/Modify/Write sequence of operations. Although the MECs do not implement the logic used to control Directory State information, it is closely tied to the Directory State control logic because it provides the access path to the Directory Store Expansion DIMM.

The MSU Controller 202 may also include an MSU Next State (MNS) block for each MSU Storage Segment 204a and 204b. For example, the MSU Controller 202 may include a MNS block 228a for MSU Storage Segment 204a and a MNS block 228b for MSU Storage Segment 204b. The MNS blocks 228a and 228b generate updated Directory Store state data if the Directory State is to be changed, as further described in co-pending commonly assigned U.S. patent application Ser. No. 10/318,678, filed Dec. 13, 2002, and entitled "System and Method for Accelerating Read Requests Within A Multiprocessor System", which is incorporated herein by reference. In one illustrative embodiment, the MNS blocks 228a and 228b provide the updated Directory State Data to their corresponding Directory Store Expansion during the write cycle of the Read/Modify/Write operation initiated by the corresponding MEC 224a and 224b. In cases where the Directory State does not change, the original Directory. State data may be written back to the corresponding Directory Store Expansion DIMM. As noted above, the Directory State data describes the Cache Line state, hence the name MSU Next State (MNS).

In the illustrative embodiment, each of the MEC blocks 224a and 224b can execute up to four Read/Modify/Write operations together for performance reasons. When this happens, up to four Read/Modify/Write operations can be performed in each MSU Storage Segment 204a and 204b, and the Modified data may be staged or queued in the corresponding MNS block 228a and 228b before being returned to the Directory Storage Expansion DIMM.

The MSU Controller 202 may also include four MSU Port eXercisers (MXPs) 230a–230d, each corresponding to one of the four Port Interfaces 216a–216d, respectively. The MXPs 230a–230d are primarily used to exercise the ports of the MSU 200 for initialization, diagnostic and test purposes. The MXPs 230a–230d are in most cases inactive or disabled during normal functional operation of the system.

Each MXP 230a–230d may include the necessary control, sequencing, and data generation logic to carry out the port "exerciser" functions. Each MXP 230a–230d mainly uses existing MSU data paths to perform reads and writes to the Main Storage Expansions. In some embodiments, each MXP 230a–230d can work independently on separate tasks, or a task can be divided into parts and assigned to particular MXPs 230a–230d to decrease the task execution time. When a task has been assigned to an MXP, and the address range has been specified, the MXP may begin executing the task. The MXP then generates requests to the MSU 200 by generating requests similar to those generated by the Scalability Port MegaCell 220. When the assigned task is completed, the MXP either stops, or loops on the task for a specified count, or loops on the task until interrupted by a control routine.

In some illustrative embodiments, each MXP 230a–230d may include a test mode that allows it to generate address and/or data patterns. In some cases, the address patterns that are generated attempt to maximize simultaneous switching noise (SSN) on the address lines to the Main Storage Expansion DIMMs, such as those in Main Storage Expansions 206a–206d. For example, and in one illustrative embodiment, the address patterns may be alternating all ones/all zeros with a sliding bit, similar to that shown in Table 2 below.

In an illustrative embodiment, each MXP 230a–230d can have up to four outstanding requests to the MSU 200 at any given time. A memory request is considered outstanding if it has been sent to the MSU 200 but a response has not yet been received from the MSU 200. The four outstanding requests may be tracked in a request queue, if desired. In one illustrative embodiment, each entry of the request queue may store the address of the MSU 200 originating request, a valid flag, a retry flag and a pending flag. The address of the originating request may be needed because the responses from the MSU 200 may not contain the address of the originating request. In some cases, the MXPs 230a–230d use the address of the originating request to regenerate expected data for compare purposes. The valid flag indicates that the request has been sent and an MXP 230a–230d is waiting for a response from the MSU 200. In cases of retries, the valid flag will remain set until a non-retry status is finally received. The retry flag may indicate that a retry request has been sent, and an MXP 230a–230d is waiting for a response. The pending flag is similar to the valid flag expect that it indicates an MXP 230a–230d is waiting for a retry response. The retry and pending flags are used by the MXPs to keep track of what the MXPs are doing since it is possible for the MXPs to receive successive retry responses.

The MXPs 230a–230d may be used to program and initialize the Main Storage Expansions 206a–206d and 210a–210d and the Directory Store Expansions 208 and 212. In some embodiments, the MXPs are used during MSU initialization to perform a functionality and initialization test on the MSU logic and the Main Storage Expansions 206a–206d and 210a–210d and the Directory Store Expansions 208 and 212. As noted above, there may be four MXPs 230a–230d in the MSU 200, one in each Port Interface 216a–216d, respectively. Any combination of MXPs 230a–230d can be used for initialization, but a standard configuration may include all four MXPs 230a–230d for the fastest initialization time.

One illustrative functionality and initialization test may include four passes through the entire range of the available memory address space. In one illustrative embodiment, and to simplify the design, the MXPs 230a–230d may require that the address range to be continuous. The final values written into the Main Storage Expansions 206a–206d and 210a–210d and the Directory Store Expansions 208 and 212 on the last pass of the test are the final initialization values and should have correct Error Correction Code (ECC) check bits. The final Directory Store value for each cache lines may be:

Directory State=MSU Owned
Read Conditional Response Vector=0
Previous Owner ID=Null
Cache Line Corruption Flag=0.

As indicated above, the functionality and initialization test performed by the MXPs 230a–230d may include four passes. During a first pass, the MXPs 230a–230d may write to the entire installed Main Store address range. The data pattern used during the first pass may be preset, or may be selected by an initialization routine during MSU initialization.

As indicated above, the MECs 224a and 224b always read or update the Directory Store Expansions 208 and 212 using a Read/Modify/Write operation. The state of the Directory Storage Expansions 208 and 212 after power up is typically unknown and may contain multiple bit uncorrectable errors (MUEs) and adjacent correctable errors (ACEs). As such, during the first pass, the Directory Storage error detection logic may be disabled and the MXPs 230a–230d may ignore the read data during the Read/Modify/Write operation of the Directory Store Expansions 208 and 212.

During a second pass, the MXPs 230a–230d may issue reads to the entire Main Store address range. The Main Storage read data is compared with the data pattern that was written during the first pass. Since the Directory Store Expansions 208 and 212 are always read or updated using a Read/Modify/Write operation, the MXPs 230a–230d may compare the read data read during the read cycle of the Read/Modify/Write operation to the data pattern written during the first pass. During the write cycle of the Read/Modify/Write operation, the MXPs 230a–230d may write a different data pattern such as the complement of the data pattern used in the first pass to the Directory Storage Expansions 208 and 212, if desired.

During a third pass, the MXPs 230a–230d may again write to the entire Main Store address range. In one illustrative embodiment, the data pattern used during the third pass is the complement of the data pattern used during the second pass. Because the Directory Store is always read or updated using a Read/Modify/Write operation, the MXPs 230a–230d may compare the read data to the data pattern written during the second pass. During the write cycle of the Read/Modify/Write operation, the MXPs 230a–230d may write the final initialization state to the Directory Storage Expansions 208 and 212.

During a forth pass, the MXPs 230a–230d may again read the entire Main Store address range. The main storage read data may then be compared to the data pattern written during the third pass. Because the Directory Store Expansions 208 and 212 are always read or updated using a Read/Modify/Write operation, the MXPs 230a–230d may compare the read data to the data written during the third pass, and write the same data back to the Directory Store Expansions 208 and 212, which as indicated above, is the final initialization state for the Directory Store Expansions 208 and 212. The table below summarizes the four passes of the illustrative functionality and initialization test.

| Pass | Main Store | Directory Store Read Phase | Directory Store Write Phase |
|---|---|---|---|
| 1 Store | Write Data Pattern | Ignore Read Data | Write Data Pattern #1 |
| 2 Fetch | Read and Verify Data Pattern | Read and Verify Data Pattern #1 | Write Data Pattern #2 |
| 3 Store | Write Data Pattern Complement | Read and Verify Data Pattern #2 | Write MSU owned state |
| 4 Fetch | Read and Verify Data Pattern | Read and Verify MSU Owned | Write MSU owned state |

While an illustrative functionality and initialization test has been described above, it is contemplated that the MXPs 230a–230d may perform any suitable test, as desired. In some cases, the MXPs 230a–230d can be used to help stress test the MSU 200 during normal functional operation of the MSU 200. For example, the MXPs 230a–230d may perform a series of read operations on a range of memory addresses during normal functional operation of the MSU 200. The read operations preferably would not change the state of any of the Cache Lines, but would provide an added load to the MSU 200. Alternatively, or in addition, the MXPs 230a–230d may perform read and write operations on a range of memory addresses. For example, and for each address, the MXPs 230a–230d may make the corresponding Cache Line unavailable to the system, make a copy of the Cache Line and the Directory State, write a data pattern to the Cache Line and Directory State, read back and verify the Cache Line and Directory State just written, restore the original Cache Line and Directory State, and make the Cache Line available to system. This may all occur during normal functional operation of the MSU 200, which in some cases, may help stress test the MSU 200 by creating a heavier load than normal on the MSU 200.

The above description assumes that the MXPs 230a–230d can write data or cause data to be written to the Main Storage Expansions. In the illustrative embodiment, the MXPs 230a–230d cannot write data directly to the Directory Store. The MXP can, however, issue a diagnostic command that will cause the MXS to write a value to the Directory Store. The value that is written to Directory Store is either programmed into the MXS or generated by the MXS itself. Thus, in one illustrative embodiment, the MXPs 230a–230d can directly access the Main Storage Expansions 206a–206d and 210a–210d, but cannot directly access the Directory Store Expansions 208 and 212.

To aid in testing and/or initializing the Directly Store Expansions 208 and 212, and in one illustrative embodiment, the MSU Controller 202 may include two MSU exerciser Segment (MXS) 234a and 234b, one for each MSU Storage Segment 204a and 204b, respectively. Each MXS 234a and 234b may autonomously or semi-autonomously test and initialize the corresponding Directory Store Expansions 208 and 212, respectively. Thus, each MXS 234a and 234b may be referred to as a Directory Store Exerciser block. During initialization and test, the MXS blocks 234a and 234b may work cooperatively, but independently, of the MSU Port exercisers (MXPs) 230a–230d, as further described below. That is, the MXPs 230a–230d may initiate the read and/or write requests to the MSU, including to the Directory Store Expansions 208 and 212, but the MXS blocks 234a and 234b may independently provide the desired data to the corresponding Directory Store Expansions 208 and 212, as further described below.

When an MXP makes a request to an address that is not owned by the MSU, the MSU issues a snoop to the address to get MSU ownership, and then gives ownership to the requesting MXP. The snoops occur after the MSU receives the request and before ownership is given to the requesting MXP. Thus, the snoops are generally invisible to the MXPs.

Figure 3:
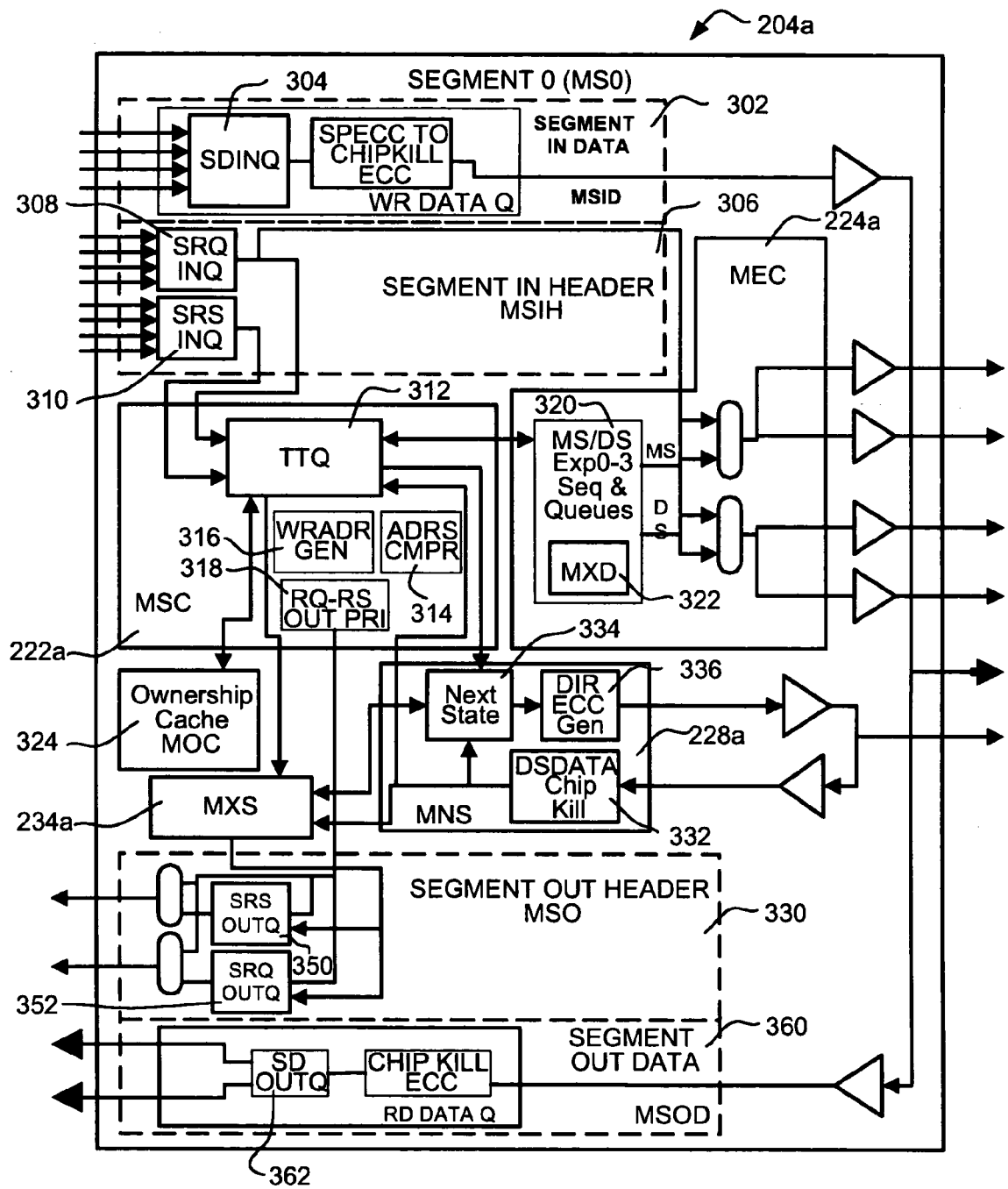
FIG. 3 is a block diagram of an MSU Segment in accordance with the present invention.

FIG. 3 is a block diagram of an MSU Storage Segment in accordance with the present invention. The MSU Storage Segment corresponds to the MSU Storage Segment "o" shown at 204a in FIG. 2, and includes a number of functional blocks. An MSU Segment In Data (MSID) block 302 is provided to handle inbound request and snoop response data flits from one of the four Port Interface blocks 216a–216d. The MSID includes one primary block, the Segment Data Input Queue (SDINQ) block 304. The SDINQ block 304 holds write data sent from one of the four Port Interface blocks 216a–216d. Each entry in the SDINQ block 304 is associated with a header entry in the MSU Segment In Header (MSIH) block 306.

The MSIH block 306 handles inbound request and snoop response header flits from one of four MSU Port Input Header (MPIH) blocks (not shown) in the Port Interface blocks 216a–216d. In the illustrative embodiment, the MSIH block 306 includes two primary blocks, the SRQ_INQ (Segment Request Input Queue) block 308 and the SRS_INQ (Segment Response Input Queue) block 310. The SRQ_INQ block 308 holds request headers received from one of the four MPIH blocks. The SRS_INQ block 310 holds snoop response headers received from one of the four MPIH blocks.

An MSU Segment Controller (MSC) block 222a (see also FIG. 2) is also shown. The MSU Segment Controller (MSC) block 222a may correspond to the MSC block 222a shown in FIG. 2. In the illustrative embodiment, the MSC 222a is the central coherency controller for the MSU Segment 204a. The MSC 222a receives inbound requests/responses from the MSIH block 306 (and MSID block 302). The primary submodule of the MSC 222a is the TTQ block 312 (Transaction Tracker Queue). The TTQ block 312 holds all inbound transactions seen by the Segment until they complete all required actions, including all required storage accesses and updates, associated Port Snoop coherency actions, and finally all responses to the requester.

Each header entry in the MSIH block 306 is represented by an entry on the TTQ block 312. As the MSC block 222a handles each request by reading or writing to the DIMMS in the Main Storage Expansions 206a–206d, the TTQ keeps track of the request and any response received from DIMMS. The response from the DIMMS will either be a read response with data or a write response. In either case, a response header will be generated, and in the case of a read response with data, there will also be an entry on the TTQ data queue. As response headers and data leave the MSC block 222a, the corresponding TTQ entries are removed.

The MSC 222a may include a number of other blocks as well. An ADRSCOMP (TTQ Address Comparator) block 314 compares the address of a new transaction against all entries of TTQ block 312 and reports matches. A WRADRSGEN (TTQ Write Address Generation) block 316 determines the next available TTQ entry to use for a new transaction. A RQRSOUTPRI (Request/Response Output Priority) block 318 contains logic that indicates when request/response transactions are ready for initiation.

An MSU Expansion Controller (MEC) block 224a (see also FIG. 2) is also shown. The MEC block 224a may correspond to the MEC block 224a shown in FIG. 2. The MEC block 224a provides the physical and electrical interface to the DIMMS in the Main Store Expansions 206a–206d and the Directory Store Expansion 208. THE MEC block 224a supplies the timing and data strobe coordination to sync up the read data with its data strobe for both the Directory Store Expansion 208 and the Main Store Expansions 206a–206d. The MEX block 224a is also responsible for the timing and control of the write data for both the Directory Store Expansion 208 and the Main Store Expansions 206a–206d. The memory request to be done is harvested from request and response transactions on the Transaction Tracker Queue (TTQ) block 312.

The MEC block 224a includes one primary module called the EXPQ (Main/Directory Storage Expansion Request Queue) block 320, which includes an MXD (MSU Exerciser DIMMs) block 322.

The MXD block 322 is used to program the DRAM devices on the DIMMs when the MSU is first powered up. Once the DIMMs (DRAMs) have been programmed, the MXD block 322 shuts itself off and is no longer active. The MXD block 322 may be needed when the internal control logic inside of the DRAM on the DIMMs must be programmed before the DRAM device can be used.

An MSU Ownership Cache (MOC) block 324 is also provided. The MOC block 324 helps accelerate the snoop requests to exclusive owners, by caching the address and owner RequesterID of exclusive state cache lines. The MOC block 324 may speed up access to Main Store by accelerating snoops. If a requester attempts to access a Main Store location that is owned by another entity, as discussed above, the Main Store address location must be snooped to return ownership back to the MSU so that ownership can be transferred to the requester.

An MSU Next State (MNS) block 228a (see also FIG. 2) is also shown. The MNS block 228a may correspond to the MNS block 228a shown in FIG. 2. The MNS block 228a determines the Next Directory State for the MSU. The illustrative MNS block 228a includes a DS Data ChipKill block 332, which receives and corrects the input read data using a chip kill correction approach. The MNS block 228 also includes a Next State block 334, which generates the next state data based on the current state and incoming functions. The Next State block 334 provides the updated directory state for the cache line to the DIR ECC Gen block 336. The MNS block 228 also includes a Dir ECC Gen module, which regenerates ECC on the updated data and supplies it back to the Directory Store.

When an address in Main Store is accessed, the corresponding entry in the Directory Store is accessed to determine what state the cache line is in and who owns it. The DS Data ChipKill block 332 receives Directory Storage read data (also known as the Directory State) and performs ECC correction. The Next State block 334 calculates the next Directory State to be written into directory storage, given the current state, the input request, and the ID of the requester. The Directory Store entry is always accessed as a Read/Modify/Write operation. If there is no change to the Directory Store entry, the original entry is rewritten back into the Directory Store DIMM. An MSU eXerciser Segment (MXS) block 234a (see also FIG. 2) is also shown. The MXS block 234a may correspond to the MXS block 234a shown in FIG. 2. The MXS block 234a helps test and initialize the Directory Storage Expansion 208 by intercepting and replacing the functional data path to the Directory Storage Expansion 208. The MXS block 234a controls selectors which allow it to take control of the data path between the Next State block 334 and the Dir ECC Gen block 336. Normally the Next State block 334 sends the updated Directory State data to the Dir ECC Gen block 336 during the Directory Store Read/Modify/Write operation. The Dir ECC Gen block 336 in turn sends the Directory State data to the MEC block 224a, which then writes it to the Directory Store Expansion DIMM. Under certain condition, the MXS block 234a will activate a selector 440 (see FIG. 4) and replace the Directory State data with a value that it has generated. The MXS block 234a can also capture a copy of the Directory Store being sent to the Dir ECC Gen block 336 so that this value can be read via scan set logic, when desired.

An MSU Segment Out Header (MSOH) block 330 is also shown. The MSOH block 330 is responsible for handling outbound request and response header flits to one of four MSU Port Output Header (MPOH) blocks (not shown) in the Port Interface blocks 216a–216d. The MSOH block 330 has two primary blocks including a SRQOUTQ (Segment Request Output Queue) block 350 and the SRSOUTQ (Segment Response Output Queue) block 352. These queues harvest outbound responses and requests from the Segment's Transaction Tracker Queue (TTQ) to one of the four Port Interface blocks 216a–216d.

An MSU Segment Out Date (MSOD) block 360 is also shown. The MSOD block 360 handles outbound read data and snoop response data to one of four MSU Port Data Out (MPOD) blocks (not shown) in the Port Interface blocks 216a–216d. The MSOD block 360 includes an SDOUTQ block 362. The SDOUTQ block 362 holds read data to be sent to one of the four MPOD sections. Each entry in the SDOUTQ is associated with an header entry in the MSOH blocks (not shown) in the Port Interface blocks 216a–216d.

Figure 4:
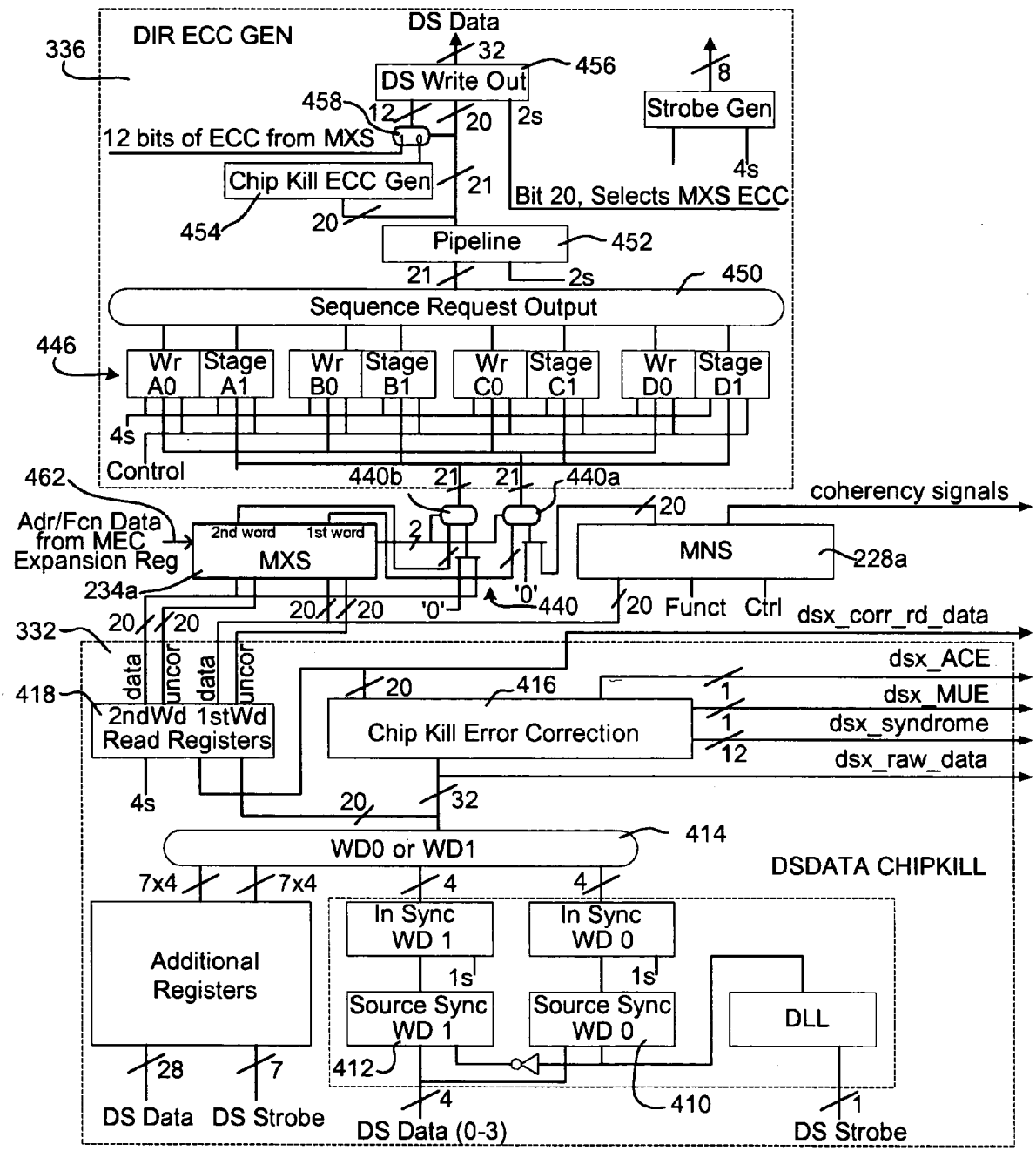
FIG. 4 is a block diagram of an illustrative MSU Next State (MNS) block in accordance with the present invention.

FIG. 4 is a block diagram of the illustrative MSU Next State (MNS) block 228a of FIG. 2 and FIG. 3. As indicated above, there are two instances of the MNS block 228a, one in each of the two MSU Storage Segments 204a and 204b (see FIG. 2). Each instance is identical but operates independent of the other. Each MNS instance communicates with its own Directory Store Expansion 208 and 212, which stores the coherency data for the four Main Storage Expansions of the corresponding MSU Storage Segment 204a and 204b.

There are three main sections of the illustrative MNS block 228a including a Directory Store (DS) Data Chip Kill section 332, the Next Stage Logic section 334 and the DRR ECC Gen section 336. The DS Data Chip Kill section 332 receives the Directory Store Data and its strobes from the corresponding Directory Store Expansion, and synchronizes it to the internal clocks of the MSU Controller 202. In the illustrative embodiment, the output of the corresponding Directory Store Expansion is always a burst of two words, so that the DS Data Chip Kill section 332 must capture both words in order to return a complete set of words during the write back sequence of the read/modify/write operation.

In the illustrative embodiment, each word from the corresponding Directory Store Expansion is 32-bits wide. The Directory Store Expansion includes eight DDR SDRAMs, each having a 4-bit word width. The eight 4-bit words from the eight DDR SDRAMs of the Directory Store Expansion are provided to eight 4-bit registers, such as 4-bit register 410, as shown. Because the output of the Directory Store Expansion DIMM is always provided in a burst of two words, the first 32-bit word (Word 0) is provided to eight 4-bit WD-0 registers, including 4-bit register 410, and the second 32-bit word (Word-1) is provided to eight 4-bit WD-1 registers, including 4-bit register 412.

Once captured, a selector 414 sequentially selects between the first word and the second word, and provides the result to a Chip Kill Error Correction Block 416. The Chip Kill Error Correction block 416 is used to correct 4-bit adjacency failures in the 32-bit words from the Directory Store Expansion DIMM. As noted above, the Directory Store Expansion DIMM includes eight DDR SDRAM devices each with a 4-bit data width, so this Error Correction Code can correct all combinations of chip data failures, hence the name Chip kill. Since the correction scheme is able to correct more than single bit errors, the term ACE (Adjacency Correction Errors) is used. The corrected word provided by the Chip Kill Error Correction block 416 is provided to Read Registers 418.

The Read Registers 418 receive the corrected read data from the Chip Kill Error Correction block 416 for both Word-0 and Word-1, and also the uncorrected read data from the Selector 414. The corrected read data for Word-0 is provided to the Next State Logic section 334. The Next State Logic section 334 combines the information from the corrected read data word with function and control codes to produce the value of the Next Directory State, as well as coherency signals used by the corresponding MEC (see FIG. 2) to maintain ownership/shared relationships. During normal functional operation, the new Next State value is sent to the DIR ECC Gen section 336 via a selector 440a, where it is stored in the Write State Registers generally shown at 446 until write back time.

The DIR ECC Gen section 336 collects and stores new Directory Store state values and second word pass through values for up to four directory requests until they are all written back to the corresponding Directory Store Expansion as part of the normal Read/Modify/Write operation. A Sequence Request Output multiplexer 450, controlled by the corresponding MEC, feeds a Pipeline staging register 452 which is used to align data signals to the DIMM clock cycles before a Chip Kill ECC Gen block 454 generates ECC data.

The lower 20 bits (19:0) provided by each of the 21-bit selectors 440a and 440b are used as MXS write data during the write cycle of Directory Store Expansion Read/Modify/Write operations. The upper bit (bit 20) is set by the MXS control logic when the MXS is executing a Diagnostic Directory Store Expansion ECC write operation. This bit is propagated with the data into the DIR ECC Gen block 336. When bit 20 is set, the selector 458 in the DIR ECC Gen block 336 selects ECC data from the MXS ECC data lines. When bit 20 is not set, the selector 458 selects ECC data generated by the Chip Kill ECC Gen block 454. The result is passed to a Directory Store Expansion write output register 456, and is subsequently written to the Directory Store Expansion during the write cycle of the Read/Modify/Write operation. The combined ECC/data is returned to the DIMM via the same signal lines on which read data was received. Strobe signals are generated with the edges of the strobe already aligned with the center of the data, as required by some DIMMs, and returned on the same strobe signal lines.

To support test and initialization of the Directory Store Expansions, and as noted above, an MXS (MSU eXerciser Segment) (e.g. MXS 234a or MXS 234b) is provided for each MSU Storage Segment 204a and 204b (see FIG. 2). In the illustrative embodiment, the MXS blocks 234a and 234b work by intercepting and replacing data in the normal functional data path of the corresponding MNS block 228a and 228b. For example, and with respect to the MSU Storage Segment 0 204a, during the Read/Modify/Write cycle of the Directory Store Expansion 208, MXS 234a intercepts data sent to the MNS block 228a during Read operations, and replaces the data sent during the Write operation.

This is shown in FIG. 4. The output of MXS 234a is provided to a selector 440, which is shared with the MNS block 228a. The selector 440 includes a selector 440a for the first word and a selector 440b for the second word. The selector 440 controls whether data is sourced from the MNS block 228a (normal) or the MXS block 234a (initialization, test and/or diagnostics). The selector 440 is controlled by the MXS block 234a, as shown.

As noted above, the MNS block 228a does Directory Store Operations on a two one-word read/modify/write basis. The MXS block 234aa can replace the normal data path by controlling the two input selectors 440a and 440b that feed the MNS Write Stage Registers, which are generally shown at 446. During initialization, the selectors 440a and 440b may be configured to select the output of the MXS block 234a, and during maintenance/diagnostic operations, the selectors 440a and 440b may be configured to only select the output of the MXS block 234a when specific diagnostic function codes are provided from the corresponding MEC block 224a via interface 462. The MXS 234a gets function and address data for each request from the corresponding MEC block 224a, as shown.

In one illustrative embodiment, the MXS 234a generates read compare data and write data patterns by using fixed or variable data patterns. For example, variable data patterns may use the lower bits of the Directory Store Expansion address as a seed value. Using the Directory Store Expansion address as a seed value allows the MXS block 234a to generate predictable data without having a direct connection the MXP 230a–230d that originally issued the diagnostic operation. In one illustrative embodiment, and as further described below with respect to FIG. 5, the MXS 234a may have two identical pattern generators capable of creating fixed data patterns, variable data patterns (e.g. using address bits as a seed) and/or a specific data pattern that has been scanned into a dynamic buffer. One of the pattern generators is used to create write data used during the write cycle of the Read/Modify/Write operation of the corresponding Directory Storage Expansion. The other pattern generator is used to generate compare data for the read cycle of the Read/Modify/Write operation. The type of data pattern may be controlled by a dynamically scanned register, which may be set up in software. In some embodiments, the read compare can be disabled. This may be desirable when, for example, the data read on the first pass of the Read/Modify/Write sequence after power up is unknown and could have parity/ECC errors.

In some embodiments, and as discussed above, the MXS 234a may be used to initialize the corresponding Directory Store Expansion 208 during initialization and to provide a read/write path to the Directory Store Expansion 208 for diagnostic/test purposes. The MXS 234a may be used differently during initialization than for during diagnostic operations. During initialization, the MSU test and initialization may involve both an MXP 230a–230d and an MXS block 234a. An MXP 230a–230d may issue write and read commands to test the Main Store and set it to an initialized state. Each of the write and read operations by the MXPs 230a–230d may have a corresponding Directory Store Expansion operation to maintain the correct Directory State for the MSU.

During initialization the MXS 234a may do several things. For example, the MXS 234a may generate expected Directory Store read data based on programmable Mode Control Switch settings, as further described below with respect to FIG. 5. The expected Directory Store read data can be a specific data pattern or one of several variable data patterns that are generated based on mode switch setting and mode switch specified address bits. The MXS 234a may also compare the actual data read from the Directory Store Expansion with expected read data, as described above. The MXS 234a may also replace the Directory State information that is to be written with a test data pattern that is generated based on programmable Mode Control Switch settings, and in some cases address. The test data pattern can be a specific data pattern or one of several variable data patterns that are generated based on Mode Control Switch setting and specified address bits. In some cases, the MXS 234a will do each of these three functions during each read/modify/write cycle of the corresponding Directory Store Expansion.

Figure 5:
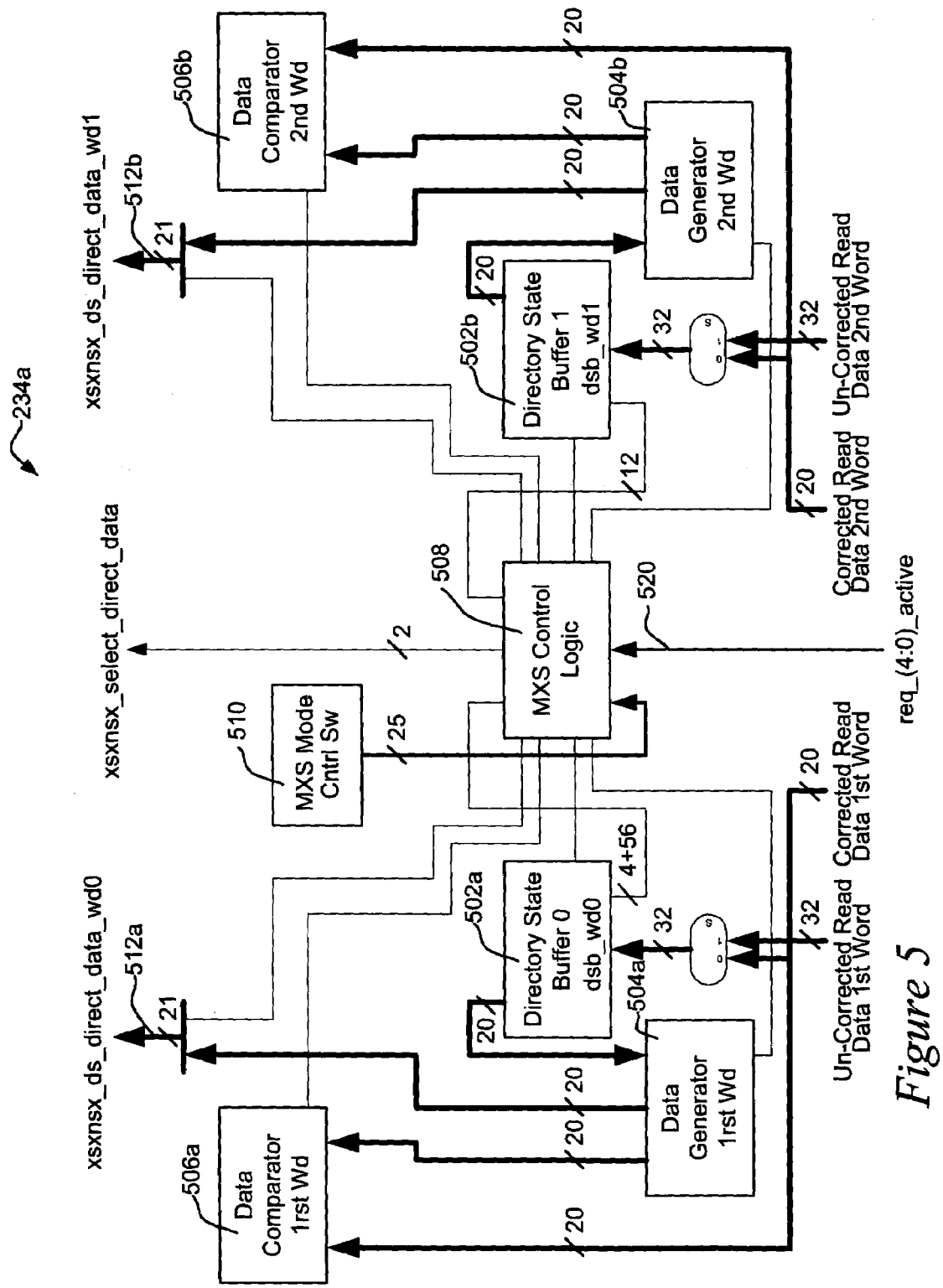
FIG. 5 is a block diagram of an illustrative MSU Exerciser Segment (MXS) block in accordance with the present invention.

During diagnostics, the MXPs 230a–230d may provide the ability to read and write a Directory Store location associated with a specific Cache Line address. To do this, and in one illustrative embodiment, one of the MXPs 230a–230d may initiate a read operation of a desired Cache Line address. The Main Store results of this read operation are ignored. The only purpose of the read operation is to cause a Directory Store Read/Modify/Write operation to the Directory Store location that corresponds to the specified Cache Line address. As noted above, and in the illustrative embodiment, the Directory Store Expansion is always accessed using a Read/Modify/Write operation. For read operations, the MXS 234a may capture the Directory State information in a dynamically scannable register called a Directory State Buffer, as shown in FIG. 5 below. The current Directory Store information is then written back to the Directory Store Expansion DIMM. For write operations, the Directory Store data pattern to be written may be dynamically scanned into the Directory State Buffer (see FIG. 4 below) of the corresponding MXS 234a. During the read/modify/write cycle, the contents of the Directory State Buffer may then replace the Next State generated by the MNS block 228a, and is written to the Directory Store Expansion.

As can be seen, the MXS 228a may be used to help test, initialize, and perform diagnostic operations on the corresponding Directory Store Expansion, even though the Directory Store Expansion cannot be directly accessed by the Port Exercisers (MXPs) 230a–230d. In the illustrative embodiment, the MXS 234a tests and initializes the corresponding Directory Storage Expansion by intercepting and replacing the functional data path to the Directory Storage Expansion. The MXS 234a works with Directory Store Read/Modify/Write cycles that result from MXP operations. Although the Read/Modify/Write cycle is initiated by one of the MXPs 230a–230d, the MXS 234a operates separately of the MXPs 230a–230d. This may reduce or eliminate the need for synchronization logic between the MXS 23a and the MXPs 230a–230d, which could add significant complexity to the design.

The MXS 234a also reads data from the Directory Store Expansion by sampling MNS block 228a read data during Directory Store Expansion Read/Modify/Write cycles, and writes data to the corresponding Directory Store Expansion by replacing MNS write data during Directory Store Expansion Read/Modify/Write cycles. The MXS 234a may both generate write data and expected read data for MXS initialize and test operations using, for example, a data pattern generator seeded by address, as further described below with respect to FIG. 5. This may allow the MXS 234a to compare the read data against one data pattern while writing a different data pattern back to the Directory Store Expansion location during a single Read/Modify/Write operation. The MXS test data pattern generator(s) may run independently of an MXP test data pattern generator but still produce repeatable and predictable results.

As indicated above, all accesses to the Directory Store Expansions employ Read/Modify/Write operations. Whenever possible, and within timing constraints, four Directory Store Expansion Read/Modify/Write operations are combined as four reads followed by four writes. This may be done to make the most efficient use of the data and control buses to the Directory Store Expansions.

FIG. 5 is a block diagram of an illustrative MSU Exerciser Segment (MXS) 234a in accordance with the present invention. As indicated above, and in the illustrative embodiment, the MXS 234a works with two one-word wide interfaces. Because of timing considerations, the MXS 234a has duplicated logic for each of the one-word wide data paths. For example, there are two Directory State buffers 502a and 502b, two Data Generator modules 504a and 504b, and two Data Comparator modules 506a and 506b. There is one MXS Control Logic block 508 and one MXS Mode Control Switch block 510.

The MXS 234a includes two 21-bit buses 512a and 512b that feed the 2-input selectors 440a and 440b that feed the Dir ECC Gen block 336 (see FIG. 4). Each of the 21-bit buses 512a and 512b is driven by one of the Data Generator Modules 504a and 504b. The Data Generator Modules 504a and 504b are controlled by the MXS Control Logic Block 508 and MXS Mode Control Switch block 510. The lower 20 bits (19:0), provided by each of the 21-bit buses 512a and 512b, are used as MXS write data during the write cycle of Directory Store Expansion Read/Modify/Write operations. The data provided by the Data Generator Modules 504a and 504b is either the contents of the corresponding Directory State Buffer 502a or 502b, or data generated by the corresponding Data Generator Module 504a and 504b.

ECC Gen block 336 selects the ECC generated by the Chip Kill ECC Gen block 454 shown in FIG. 4.

In the illustrative embodiment, the MXS Mode Control Switch block 510 includes a dynamically scannable register (not shown) that is used to control the operation of the MXS logic. This register is defined in Table 1 below.

TABLE 1

MXS Mode Control Switches

| Name | MXS Setup Reg Bits | Bits | Dyn/ Static | Definition |
|---|---|---|---|---|
| mode_rd_data_pat_wd1 | 24:22 | 3 | D | Selects expected data pattern to be compared with read data during read/modify/write operation for wd1. See table below for values. |
| Mode_wr_data_pat_wd1 | 21:19 | 3 | D | Selects write data pattern to be written during read/modify/write operation for wd1. See table below for values |
| mode_rd_data_pat_wd1_inv | 18 | 1 | D | Inverts data patterns for expected read data for wd1 when mxs_dyn_mode_wo_reg [24:22] = 4–7. Does not affect patterns for 0–3. |
| mode_wr_data_par_wd1_inv | 17 | 1 | D | Inverts data patterns for write data generated for wd1 when mxs_dyn_mode_wo_reg [21:19] = 4–7. Does not affect patterns for 0–3. |
| mode_en_crdc_err_detect | 16 | 1 | D | Enables CL and CRDC error detection when in diagnostic mode |
| mode_rd_data_pat_wdo | 15:13 | 3 | D | Selects expected data pattern to be compared with read data during read/modify/write operation for wdo. See table below for values. |
| mode_wr_data_pat_wdo | 12:10 | 3 | D | Selects write data pattern to be written during read/modify/write operation for wdo. See table below for values |
| mode_rd_data_pat_wdo_inv | 9 | 1 | D | Inverts data patterns for expected read data for wdo when mxs_dyn_mode_wo_reg [15:13] = 4–7. Does not affect patterns for 0–3. |
| mode_wr_data_pat_wdo_inv | 8 | 1 | D | Inverts data patterns for write data generated for wdo when mxs_dyn_mode_wo_reg [12:10] = 4–7. Does not affect patterns for 0–3. |
| mode_en_init_data_capture | 7 | 1 | D | Enables MXS to capture incoming DS data from MNS when in init_mode. |
| mode_asm_control | 6:4 | 3 | D | ASM field, selects which address bits are used for data pattern generation. |
| mode_en_rd_miscomp | 3 | 1 | D | Enables read miscompares for wdo and wd1 |
| mode_load_dsb_out | 2 | 1 | D | Load contents of DSB's into output registers after dynamic scan is complete |
| mode_en_debug_err | 1 | 1 | D | Enables special debug feature that allows MXS to use DSB to compare against DS or address and send errors to MMC on match. Enables errors 0 and 1. |
| mode_init_mode | 0 | 1 | D | Used by C-sharp/TCL/IMS to indicate that MSU is being initialized. This causes the MXS to always hijack the data path to the MNS Next State module. |

The upper bit (bit 20) is set by the MXS control logic when the MXS is executing a Diagnostic Directory Store Expansion ECC write operation. This bit is propagated with the data to the DIR ECC Gen block 336 of FIG. 4. When the bit is set, the selector 458 in the DIR ECC Gen block 336, which sits in front of the Directory Store Expansion write output register 456, selects ECC data from the MXS ECC data lines. When the bit is not set, the selector 458 in the DIR Each of the Directory State Buffers 502a and 502b is a dynamically scannable register that can be used for several purposes. For example, it can be used to supply a specific data pattern to the corresponding Data Generator Module 504a or 504b, or to the corresponding Data Comparator Module 506a or 506b through the Data Generator Module. For Directory Store diagnostic operations, a specific diagnostic function code may be set in an MXP 230a–230d (see FIG. 2) and executed. The MXS 234a decodes the function codes associated with the Directory Store operations. When the MXS 234a encounters a diagnostic Directory Store read function code, the MXS 234a captures the current value of the Directory State in the corresponding Directory State Buffer 502a or 502b. When a diagnostic write function is encountered in the MXS 234a, the corresponding Directory State Buffer 502a or 502b may be used as a data source for the Directory Store write operation in the read/modify/write sequence of the corresponding Directory Store Expansion. This may be useful when, for example, a fixed data pattern or a specific value is to be written to an address in the Directory Storage Expansion. The selector in the corresponding Data Generator block may simply select the output of the Directory State Buffer, and provide the contents for writing to the Directory Storage Expansion.

In some embodiments, the fixed data pattern or specific value that is written to the Directory Storage Expansion may include an intentional ECC error. This may help test the error correction circuitry, such as the error correction circuitry in Chip Kill Error Correction block 416 of FIG. 4.

As noted above, there are two identical Data Generator Modules 504a and 504b, one for each data word path. The Data Generator Modules 504a and 504b are used to provide fixed data patterns, variable data patterns or a specific value. In some embodiments, the variable data patterns are created using selected address bits as seed values so that expected data can later be predicted. In one illustrative embodiment, each Data Generator Module 504a and 504b has two pattern generators: one pattern generator for providing data to be compared to the read data word; and one pattern generator for providing write data to be written to the corresponding Directory Store Expansion. This may allow one data pattern to be used during the read cycle of a Read/Modify/Write operation for read data compare, and another data pattern for writing a new value to the Directory Store Expansion during the write cycle of the Read/Modify/Write operation.

The Data Pattern generated by each of the Data Generator Modules 504a and 504b may be selected by MXS Mode Control Switch block 510. As indicated above, the Data Pattern can be, for example, a fixed data pattern or a variable data pattern. In one illustrative embodiment, there are three types of variable data patterns that can be employed including, for example: (1) a modified Wagner pattern; (2) a sliding 1/0 pattern; and (3) a sliding pair pattern. When a variable data pattern is selected, the corresponding Data Generator Module 504a or 504b may use three of the address bits to select the specific pattern provided by the corresponding Data Generator Module. The MXS Control Logic block 508 may include an Address Selection Matrix (ASM), which may include logic controlled by the MXS Mode Control Switch block 510, that selects which of the three address bits are to be used by the Data Generator Module. The following table describes how the MXS Mode Control Switch block 510 may control the Data Generator Modules 504a and 504b, and the correspondence between the three Address bits (2:0) selected by the ASM and a specific data pattern.

TABLE 2

Expected/Write Data Values

| Control | | | Adrs Matrix | | | Directory State | Notes |
|---|---|---|---|---|---|---|---|
| 2 | 1 | 0 | 2 | 1 | 0 | 19:0 | |
| 0 | 0 | 0 | x | x | x | 00100000000000000000 | MSU init pattern (MSU owned) |
| 0 | 0 | 1 | x | x | x | = Directory State Buffer | use contents of data buffer |
| 0 | 1 | 0 | x | x | x | 01010101010101010101 | binary 01 (without adrs matrix) |
| 0 | 1 | 1 | x | x | x | 10101010101010101010 | binary 10 (without adrs matrix) |
| 1 | 0 | 0 | 0 | 0 | 0 | 10101010101010101010 | alternating 01 pattern |
| 1 | 0 | 0 | 0 | 0 | 1 | 01010101010101010101 | alternating 01 pattern |
| 1 | 0 | 1 | 0 | 0 | 0 | 11001100110011001100 | modified Wagner pattern #1 |
| 1 | 0 | 1 | 0 | 0 | 1 | 00110011001100110011 | modified Wagner pattern #2 |
| 1 | 0 | 1 | 0 | 1 | 0 | 11000011110000111100 | modified Wagner pattern #3 |
| 1 | 0 | 1 | 0 | 1 | 1 | 00111100001111000011 | modified Wagner pattern #4 |
| 1 | 0 | 1 | 1 | 0 | 0 | 11000000001111111111 | modified Wagner pattern #5 |
| 1 | 0 | 1 | 1 | 0 | 1 | 00111111110000000000 | modified Wagner pattern #6 |
| 1 | 0 | 1 | 1 | 1 | 0 | 00000000001111000000 | modified Wagner pattern #7 |
| 1 | 0 | 1 | 1 | 1 | 1 | 11111111110000111111 | modified Wagner pattern #8 |
| 1 | 1 | 0 | 0 | 0 | 0 | 00010001000100010001 | sliding 1 pattern #1 |
| 1 | 1 | 0 | 0 | 0 | 1 | 00100010001000100010 | sliding 1 pattern #2 |
| 1 | 1 | 0 | 0 | 1 | 0 | 01000100010001000100 | sliding 1 pattern #3 |
| 1 | 1 | 0 | 0 | 1 | 1 | 10001000100010001000 | sliding 1 pattern #4 |
| 1 | 1 | 0 | 1 | 0 | 0 | 11101110111011101110 | sliding 0 pattern #1 |
| 1 | 1 | 0 | 1 | 0 | 1 | 11011101110111011101 | sliding 0 pattern #2 |
| 1 | 1 | 0 | 1 | 1 | 0 | 10111011101110111011 | sliding 0 pattern #3 |
| 1 | 1 | 0 | 1 | 1 | 1 | 01110111011101110111 | sliding 0 pattern #4 |
| 1 | 1 | 1 | 0 | 0 | 0 | 00011000110001100011 | sliding inverting pairs pattern #1 |
| 1 | 1 | 1 | 0 | 0 | 1 | 11100111001110011100 | sliding inverting pairs pattern #2 |
| 1 | 1 | 1 | 0 | 1 | 0 | 00110001100011000110 | sliding inverting pairs pattern #3 |
| 1 | 1 | 1 | 0 | 1 | 1 | 11001110011100111001 | sliding inverting pairs pattern #4 |
| 1 | 1 | 1 | 1 | 0 | 0 | 01100011000110001100 | sliding inverting pairs pattern #5 |
| 1 | 1 | 1 | 1 | 0 | 1 | 10011100111001110011 | sliding inverting pairs pattern #6 |
| 1 | 1 | 1 | 1 | 1 | 0 | 11000110001100011000 | sliding inverting pairs pattern #7 |
| 1 | 1 | 1 | 1 | 1 | 1 | 00111001110011100111 | sliding inverting pairs pattern #8 |

In Table 2, M2, M1, and M0 are "address" bits from the Address Selection Matrix, and "x" indicates a don't care condition.

In the illustrative embodiment, there are four request slots in the MNS block 228a, one for each of the four Main Storage Expansion Registers present in each of the MEC blocks 224a and 224b. Address and function data for each of the four possible requests is sent to the MXS 234a, as shown by address/function lines 462 in FIG. 4. The MXS uses timing chain signals (req_x_active), shown generally at 520, to determine which of the four requests is currently active.

The write data provided by the Data Generator Blocks can be variable data based on address bits or a fixed pattern of some type, as described above. The read data is provided to the Data Comparator Blocks 506a and 506b and the Directory State Buffers 502a and 502b. Selectors 522a and 522b may be provided at the input of the corresponding Directory State Buffers 502a and 502b to select between corrected or uncorrected read data words. Corrected read data words are provided to the Data Comparator Blocks 506a and 506b.

The Data Comparator Blocks 506a and 506b may check the corrected read data against expected values that are generated by the corresponding Data Generator blocks 504a and 504b. If a miss-compare is detected, the address, actual read data and expected read data may be stored, and the system may be notified, as desired.

Figure 6:
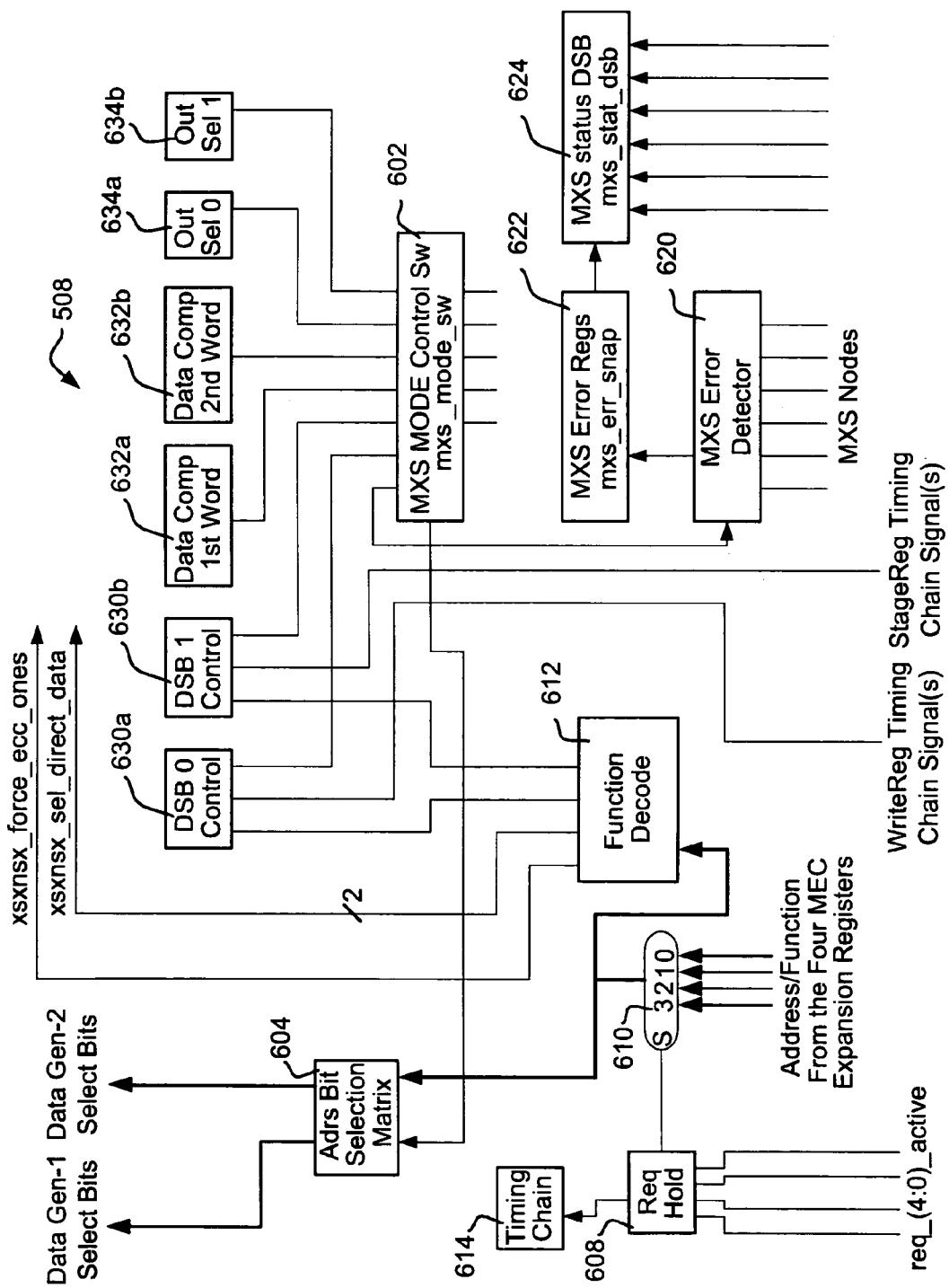
FIG. 6 is a block diagram of an illustrative MXS Control Logic block in accordance with the present invention.

FIG. 6 is a block diagram of one illustrative embodiment of the MXS Control Logic block 5o8 of FIG. 5. The MXS Control Logic block 508 is controlled by a number of MXS Mode Control Switches 602. The MXS Mode Control Switches 602 may be the same as Mode Control Switch block 510 of FIG. 5. The MXS Mode Control Switches 602 are also defined in Table-1 above. The MXS Mode Control Switches 602 may provide control to the Directory State Buffers 502a and 502b, as indicated at 630a and 630b, respectively. Likewise, the MXS Mode Control Switches 602 may provide control to the Data Comparator blocks 506a and 506b, as indicated at 632a and 632b, respectively. Similarly, the MXS Mode Control Switches 602 may provide control to the output selectors in the Data Generator Blocks, as indicated at 634a and 634b, respectively. The MXS Mode Control Switches 602 may provide control over the Data Generator Modules 504a and 504b as shown on FIG. 5.

An Address Selection Matrix 604 may be provided, and may be used to choose which address bits are used by the Data Generator blocks 504a and 504b of FIG. 5. In one illustrative embodiment, the Address Selection Matrix 604 is a selector driven by the MXS Mode control Switches 602, and controls how the Row Address (RAS), Column Address (CAS), and Bank Select (BS) bits of the Directory Storage Expansion DIMMS are mapped to the "address" bits used to generate data patterns in the corresponding Data Generator blocks 504a and 504b of FIG. 5. The Address Selection Matrix 604 is controlled by MXS Mode Control Switches 602 as defined in Table 3 below.

TABLE 3

Address Selection Matrix

| Mode Control Sw | | | Address Selection Matrix to Data Generation Logic | | | Comments |
|---|---|---|---|---|---|---|
| 2 | 1 | 0 | M2 | M1 | M0 | |
| 0 | 0 | 0 | CAS[2] | CAS[1] | CAS[0] | 64/128 bit basic matrix decode (default) |
| 0 | 0 | 1 | BS[0] | CAS[3] | CAS[2] | 64 bit CL alternate matrix decode |
| 0 | 1 | 0 | CAS[4] | CAS[3] | CAS[2] | 64 bit CL alternate w/o BS bits in decode |
| 0 | 1 | 1 | CAS[4] | BS[0] | CAS[2] | 64 bit CL alternate skipping Interleave bits |
| 1 | 0 | 0 | BS[1] | BS[0] | CAS[0] | 64/128 bit basic matrix decode with BS bits |
| 1 | 0 | 1 | BS[1] | BS[0] | CAS[3] | 128 bit CL alternate matrix decode |
| 1 | 1 | 0 | CAS[5] | CAS[4] | CAS[3] | 128 bit CL alternate w/o BS bits in decode |
| 1 | 1 | 1 | CAS[6] | CAS[5] | CAS[4] | 128 bit CL alternate skipping Interleave bits |

The MXS Control Logic block 508 also includes a Req Hold block 608. The Req Hold block 608 may be used to hold the value of the last request that was executed. When one of the four "req_x_active" signals (where x=0–3) goes active, the Req Hold block 608 causes a selector 610 to select the corresponding one of the four MEC expansion registers associated with the request. This will persist until the next request is received. The req_x_active (where x=0–3) signals are used to identify if a request is active and which of the four Main Storage Expansion slots it is identified with. When one of the req_x_active (where x=0–3) signals goes active, a request to the corresponding Main Storage Expansion has started. The MXS 234a may then pass the corresponding address/function signals to a Function Decode block 612. The Function Decode block 612 may decode the address/function signals. The Req Hold block 608 may also initiate a corresponding timing chain in Timing Chain block 614.

The timing chain block 614 may control the sequential operation of the MXS 234a. There is one timing chain for each of the four Main Storage Expansions. Each timing chain controls when the MXS 234a captures data. For example, and in one illustrative embodiment, uncorrected read data (see FIG. 5) must be captured one cycle before the corrected read data. Each timing chain also enables the Function Decode block 612 to decode the corresponding function and address before the uncorrected read data arrives, so that this data can be captured if necessary.

The Function Decode block 612 decodes the function code for the active request. The four req_x_active (x=0–3) signals shown at 620 are used to determine if a request is active and which of the four Main Storage Expansion slots the request corresponds to. For example, if the decoded function is a diagnostic read or write, the Function Decode block 612 may cause the corresponding Directory State Buffer 502a or 502b of FIG. 5 to load or capture data as appropriate.

The MXS Control Logic block 508 may include an MXS Error Detector block 620. The MXS Error Detector block 620 detects errors in the control logic as well as various other modules in the MXS. The errors are sent as pulses or levels to the MXS Error Registers 622. The MXS Error Registers 622 may be read as part of a MXS status request 624, if desired.

Having thus described the preferred embodiments of the present invention, those of skill in the art will readily appreciate that the teachings found herein may be applied to yet other embodiments within the scope of the claims hereto attached.

What is claimed is:

1. A directory-based coherent memory, comprising:
a Main Store for storing a number of data entries;
a Directory Store for storing a directory state for at least some of the data entries in the Main Store;
a next state block for determining a next directory state for a requested data entry in response to a request to the directory-based coherent memory;
a Directory Store exerciser block for providing a Directory Store exerciser state entry; and
a selector coupled to the Directory Store for providing a next directory state to the Directory Store, the selector selecting between the next directory state provided by the next state block and the exerciser state entry provided by the Directory Store exerciser block.

2. The directory-based coherent memory of claim 1 wherein the Directory Store exerciser block includes a data generator for generating the exerciser state entry.

3. The directory-based coherent memory of claim 1 wherein the Directory Store exerciser block includes a data generator for generating expected Directory Store read data.

4. The directory-based coherent memory of claim 3 wherein a current directory state of the requested data entry is read from the Directory Store.

5. The directory-based coherent memory of claim 4 wherein the current directory state of the requested data entry is provided to both the next state block and the Directory Store exerciser block.

6. The directory-based coherent memory of claim 5 wherein the next state block uses the current directory state of the requested data entry to determine the next directory state for the requested data entry.

7. The directory-based coherent memory of claim 6 wherein the Directory Store exerciser block includes a comparator for comparing the current directory state of the requested data entry to a generated data element.

8. The directory-based coherent memory of claim 7 wherein the current directory state of the requested data entry is read from the Directory Store using a read/modify/write operation.

9. The directory-based coherent memory of claim 8 wherein the comparator of the Directory Store exerciser block compares the current directory state of the requested data entry read from the Directory Store during the read cycle of the read/modify/write operation using the expected Directory Store read data, and the data generator of the Directory Store exerciser block generates an exerciser state entry, and the selector selects the exerciser state entry provided by the Directory Store exerciser block, during the write cycle of the read/modify/write operation.

10. The directory-based coherent memory of claim 4 wherein the current directory state for the requested data entry is stored at an address in the Directory Store, and the data generator of the Directory Store exerciser block generates a data pattern for the exerciser state entry that is at least in part dependent on the address.

11. The directory-based coherent memory of claim 1 wherein the exerciser state entry provided by the Directory Store exerciser block intentionally includes an ECC error.

12. The directory-based coherent memory of claim 1 further comprising a port exerciser block for initiating selected reads and writes to the directory-based coherent memory.

13. The directory-based coherent memory of claim 12 wherein the selected reads and writes initiated by the port exerciser block include initialization writes that initialize the state of the directory-based coherent memory.

14. The directory-based coherent memory of claim 12 wherein the selected reads and writes initiated by the port exerciser block include diagnostic reads and writes to the directory-based coherent memory.

15. The directory-based coherent memory of claim 12 wherein the selected reads and writes initiated by the port exerciser block include initialization and diagnostic reads and writes to the directory-based coherent memory.

16. The directory-based coherent memory of claim 12 wherein the selector selects the exerciser state entry provided by the Directory Store exerciser block during at least selected writes to the directory-based coherent memory initiated by the port exerciser block.

17. The directory-based coherent memory of claim 12 wherein the directory-based coherent memory includes two or more input ports, and each input port includes a port exerciser block.

18. The directory-based coherent memory of claim 17 wherein the directory-based coherent memory includes four input ports, and each input port includes a port exerciser block.

19. The directory-based coherent memory of claim 18 wherein the directory-based coherent memory includes two memory segments, with each memory segment having a Main Store for storing a number of data entries and a Directory Store for storing a directory state for at least some of the data entries in the Main Store.

20. The directory-based coherent memory of claim 19 wherein each of the two memory segments further includes a next state block, a Directory Store exerciser block, and a selector.

21. The directory-based coherent memory of claim 1 wherein the Directory Store exerciser block is controlled, at least in part, by one or more programmable mode control switches.

22. A directory-based coherent memory, comprising:
Main Store means for storing a number of data entries;
Directory Store means for storing a directory state for at least some of the data entries;
next state means for determining a next directory state for a requested data entry in response to a request to the directory-based coherent memory;
directory exerciser means for providing a Directory Store exerciser state entry; and
selector means for providing a next directory state to the Directory Store means, the selector means selecting between the next directory state provided by the next state means and the exerciser state entry provided by the directory exerciser means.

23. The directory-based coherent memory of claim 22 wherein the directory exerciser means includes a data generator means for generating the exerciser state entry.

24. The directory-based coherent memory of claim 23 wherein a current directory state of the requested data entry is read from the Directory Store means.

25. The directory-based coherent memory of claim 24 wherein the current directory state of the requested data entry is provided to both the next state means and the directory exerciser means.

26. The directory-based coherent memory of claim 25 wherein the next state means uses the current directory state of the requested data entry to determine the next directory state for the requested data entry.

27. The directory-based coherent memory of claim 26 wherein the directory exerciser means includes a comparator means for comparing the current directory state of the requested data entry to a generated data element.

28. The directory-based coherent memory of claim 27 wherein the current directory state of the requested data entry is read from the Directory Store means using a read/modify/write operation.

29. The directory-based coherent memory of claim 28 wherein the comparator means of the directory exerciser means compares the current directory state of the requested data entry read from the Directory Store means during the read cycle of the read/modify/write operation, and the data generator means of the directory exerciser means generates an exerciser state entry, and the selector means selects the exerciser state entry provided by the directory exerciser means, during the write cycle of the read/modify/write operation.

30. The directory-based coherent memory of claim 24 wherein the current directory state for the requested data entry is stored at an address in the Directory Store means, and the data generator means of the directory exerciser means generates a data pattern for the exerciser state entry that is at least in part dependent on the address.

31. The directory-based coherent memory of claim 22 wherein the exerciser state entry provided by the directory exerciser means intentionally includes an ECC error.

32. The directory-based coherent memory of claim 22 further comprising a port exerciser means for initiating selected reads and writes to the directory-based coherent memory.

33. The directory-based coherent memory of claim 32 wherein the selected reads and writes initiated by the port exerciser means include initialization writes that initialize the state of the directory-based coherent memory.

34. The directory-based coherent memory of claim 32 wherein the selected reads and writes initiated by the port exerciser means include diagnostic reads and writes to the directory-based coherent memory.

35. The directory-based coherent memory of claim 32 wherein the selected reads and writes initiated by the port exerciser means include initialization and diagnostic reads and writes to the directory-based coherent memory.

36. The directory-based coherent memory of claim 32 wherein the selector means selects the exerciser state entry provided by the directory exerciser means during at least selected writes to the directory-based coherent memory initiated by the port exerciser means.

37. The directory-based coherent memory of claim 32 wherein the directory-based coherent memory includes two or more input ports, and each input port includes a port exerciser means.

38. The directory-based coherent memory of claim 37 wherein the directory-based coherent memory includes four input ports, and each input port includes a port exerciser means.

39. The directory-based coherent memory of claim 38 wherein the directory-based coherent memory includes two memory segments, with each memory segment having a Main Store means for storing a number of data entries and a means for storing a number of data entries and a Directory Store means for storing a directory state for at least some of the data entries.

40. The directory-based coherent memory of claim 39 wherein each of the two memory segments further includes a next state means, a directory exerciser means, and a selector means.

41. The directory-based coherent memory of claim 22 wherein the directory exerciser means is controlled, at least in part, by one or more programmable mode control switch means.

42. A computerized method for accessing a Directory Store of a directory-based coherent memory, the directory-based coherent memory having a Main Store for storing a number of data entries, a Directory Store for storing a directory state for at least some of the data entries in the Main Store, and a next state block for determining a next directory state for a requested data entry in response to a request, the method comprising:
  selecting either the next directory state value or an other value; and
  writing the selected value to the Directory Store.

43. The computerized method of claim 42 wherein the other value is a data pattern.

44. The computerized method of claim 42 wherein the requested data entry is stored at an address in the directory-based coherent memory, and the data pattern is at least in part dependent on the address.

45. The computerized method of claim 44 wherein the selected value is written to the Directory Store using a read/modify/write operation.

46. The computerized method of claim 45 further comprising the steps of:
  reading a current value from the Directory Store during the read cycle of the read/modify/write operation;
  comparing the current value with an expected value;
  writing the selected value to the Directory Store during the write cycle of the read/modify/write operation.

47. The computerized method of claim 44 wherein the requested data entry is requested from a port exerciser.

48. The computerized method of claim 47 wherein the port exerciser initiates reads and writes to the directory-based coherent memory.

49. The computerized method of claim 48 wherein the reads and writes initiated by the port exerciser include initialization writes that initialize the state of the directory-based coherent memory.

50. The computerized method of claim 48 wherein the reads and writes initiated by the port exerciser include diagnostic reads and writes to the directory-based coherent memory.

51. The computerized method of claim 48 wherein the reads and writes initiated by the port exerciser include initialization and/or diagnostic reads and writes to the directory-based coherent memory.

52. A computerized method for initializing a Directory Store of a directory-based coherent memory, the directory-based coherent memory having a Main Store for storing a number of data entries, a Directory Store for storing a directory state for at least some of the data entries in the Main Store, and a next state block for determining a next directory state for a requested data entry in response to a request, the directory-based coherent memory further having a selector coupled to the Directory Store, the selector selecting between the next directory state provided by the next state block and an initialization value, the method comprising:
  selecting the initialization value using the selector;
  performing a write operation to a selected address location of the directory-based coherent memory; and during the write operation, writing the initialization value selected by the selecting step to the Directory Store rather than the next directory state determined by the next state block.

53. The computerized method of claim 52 further comprising the step of:

repeating the steps of claim 52 for each of the address locations of the directory-based coherent memory.

54. A computerized method for performing diagnostics on a Directory Store of a directory-based coherent memory, the directory-based coherent memory having a Main Store for storing a number of data entries, a Directory Store for storing a directory state for at least some of the data entries in the Main Store, and a next state block for determining a next directory state for a requested data entry in response to a request, the directory-based coherent memory further having a selector coupled to the Directory Store, the selector selecting between the next directory state provided by the next state block and a write data pattern value, the method comprising:

performing a write operation to a selected address location of the directory-based coherent memory;

during the write operation, selecting a write data pattern value using the selector and writing the write data pattern value to the selected address location of the Directory Store rather than the next directory state determined by the next state block;

performing a read operation of the selected address location of the directory-based coherent memory; and during the read operation, reading a read data pattern from the selected address location of the Directory Store and comparing the read data pattern to the write data pattern value written during the write operation.

55. The computerized method of claim 54 further comprising the step of:

performing the steps of claim 54 for each of the address locations of the directory-based coherent memory.

* * * * *